United States Patent [19]

Adler et al.

[11] 3,996,796

[45] Dec. 14, 1976

[54] FLOW METER

[75] Inventors: Meryle D. W. Adler, Bradford, Pa.; John T. Brown; Ronald J. Weetman, both of Corning, N.Y.

[73] Assignee: Corning Glass Works, Corning, N.Y.

[22] Filed: Mar. 10, 1975

[21] Appl. No.: 556,810

[52] U.S. Cl. .......................................... 73/194 VS
[51] Int. Cl.² .......................................... G01F 1/32
[58] Field of Search .............................. 73/194, 204

[56] References Cited

UNITED STATES PATENTS

| | | | |
|---|---|---|---|
| 2,813,424 | 11/1957 | Liepmann | 73/194 |
| 2,870,305 | 1/1959 | Ling | 73/204 |
| 3,116,639 | 1/1964 | Bird | 73/194 |
| 3,498,127 | 3/1970 | Richards | 73/204 |
| 3,564,915 | 2/1971 | Tomota et al. | 73/194 |
| 3,645,132 | 2/1972 | Rasmussen | 73/194 |
| 3,693,438 | 9/1972 | Yamasaki et al. | 73/194 |
| 3,810,388 | 5/1974 | Cousins et al. | 73/194 |

FOREIGN PATENTS OR APPLICATIONS

| | | | |
|---|---|---|---|
| 150,656 | 12/1962 | U.S.S.R. | 73/194 |

OTHER PUBLICATIONS

Michiyoshi et al., "Measurement of Flowrate Using Temperature Fluctuation Caused by Vortex Street", Journal of Nuclear Science & Tech., pp. 511–517, vol. 7, No. 10.

*Primary Examiner*—Herbert Goldstein
*Attorney, Agent, or Firm*—William J. Simmons, Jr.; Walter S. Zebrowski; Clarence R. Patty, Jr.

[57] ABSTRACT

A flow metering apparatus comprising an elongated vortex generating element disposed transversely in a stream of fluid to produce on opposite sides thereof vortices which are shed in alternating fashion and a sensor disposed downstream of the generating element and aligned therewith in such a manner that the vortices alternately pass along opposite sides of the sensor. The sensor comprises an elongated, cylindrically shaped support having two high TCR resistive films longitudinally disposed on the surface thereof which faces the vortex generating element. This combination of vortex shedder and sensor produces a strong, highly reliable electrical signal.

11 Claims, 8 Drawing Figures

FLOW METER

CROSS-REFERENCE TO RELATED APPLICATION

This application is related to U.S. Patent Application Ser. No. 556,811 entitled "Sensing Element for Flow Meter," filed in the name of M. D. W. Adler et al. on even date herewith.

BACKGROUND OF THE INVENTION

This invention relates to flow metering apparatus of the type wherein an elongated object in a stream of flowing fluid produces a wake including a distinct pattern of vortices, referred to as Karman's vortices, which are alternately shed from opposite sides thereof in a periodic manner. This invention applies to any fluid, including liquids and gases, that is capable of producing Karman vortex behavior. There is a definite relationship between frequency $f$ of shedding of the vortices, the dimensions of the object and the velocity V of the fluid stream. For example, consider the geometry which has been the object of most studies of the shedding phenomenon, viz., a right circular cylinder of diameter $D$. The shedding frequency $f$ is expressed by $$f = KV/D \qquad 1$$

where $K$ is a constant when flow is within a certain range of velocity $V$. Thus, velocity can be determined by measuring the frequency $f$ of the generation of the vortices. For a general discussion of vortex generation, reference may be made to *Boundary Layer Theory* by H. Schlickting, 4th Edition, McGraw-Hill Book Co., Inc., pps. 27–34. That test indicates that for Reynolds numbers above about 600, the Strouhal number is constant and the relationship expressed by equation 1 will be valid. This linearity between Reynolds number and Strouhal number prevails for Reynolds numbers up to about $4 \times 10^5$ at which point the distinct pattern of vortices is replaced by random eddys. Vortex generating elements having noncircular cross-sections are taught in U.S. Pat. Nos. 3,572,117 issued Mar. 23, 1971 to A. E. Rodely and 3,693,438 issued Sept. 26, 1972 to H. Yamasaki et al. The sharp edges of the vortex generating elements of the latter patent are said to improve the correspondence of vortex production rate with flow velocity over wide conditions of flow.

Various techniques, both electrical and mechanical, have been employed for producing electrical signals responsive to the rate of vortex production. To avoid the use of moving parts, electrical transducers are usually preferred. The vortex generating element itself sometimes contains passages through which an alternating fluid flows corresponding to the alternate shedding of vortices by the vortex shedding element. This type of vortex shedding element further contains means responsive to the alternating flow of fluid to produce an electrical output. Such shedding elements are costly and complicated because of the passages and flow sensing elements disposed therein. Moreover, the cross-sectional area of such shedding elements may be greater than desired because of the contents thereof, such elements thereby excessively impeding the flow of fluid through the channel in which they are disposed.

A simple and reliable flow sensing arrangement is disclosed in Paper No. 2-16-187 entitled "The Vortex Shedding Flow Meter" by D. S. White et al. presented at the 1971 Symposium on Flow-Its Measurement and Control in Science and Industry. The flow meter disclosed in that paper, which has been employed in the metering of numerous types of fluids and gases, comprises an elongated bluff body vortex shedding element having a frontal surface containing two thermisters, one on each side of the center thereof. For that flow meter to operate successfully the shedding element must have a frontal width which is an appreciable fraction, typically approximately ⅓, of the diameter of the pipe across which it is placed. The thermisters occupy only a small fraction of the area of the frontal surface. The large area occupied by the frontal surface significantly impedes the flow of fluid, thereby causing a large pressure drop.

SUMMARY OF THE INVENTION

It is an object of the present invention to provide an improved flow metering apparatus of the type which generates and detects Karman's vortices, the frequency of shedding of which is detected to measure the velocity of fluid flow. Another object is to provide a fluid flow metering apparatus which is capable of providing a strong, reliable electrical output without causing a large pressure drop in the fluid stream.

Briefly, the present invention relates to a flow metering apparatus for measuring the velocity of a fluid stream. An elongated vortex shedding element is disposed transversely in the fluid stream for alternately producing vortices on opposite sides thereof. An elongated, cylindrically shaped substrate having a nonconductive surface is disposed downstream of the vortex shedding element and is substantially parallel thereto. A pair of resistive paths are disposed on opposite sides of the frontal surface of the substrate on which the fluid stream impinges. Means are connected to opposite ends of the resistive paths for causing a current to flow therethrough that is sufficient to heat the paths. Output means detect the periodic changes in resistance of the paths as the vortices cause differential cooling thereof and provide an electrical output indicative of the velocity of the fluid stream.

DETAILED DESCRIPTION

Figure 1:
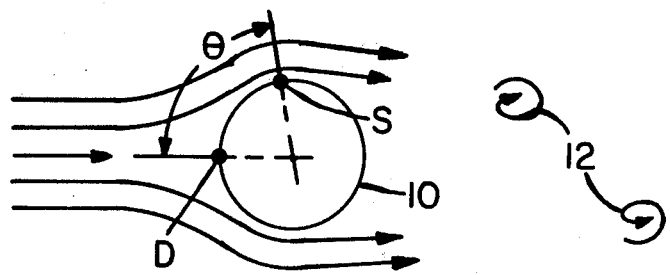
FIG. 1 is a diagrammatic illustration of the formation of vortices by an element disposed in a fluid flow.

FIG. 1 shows a cylindrical element 10 transversely disposed in a fluid stream represented by the arrows. The stream separates into two parts at the stagnation point D, these parts flowing around opposite sides of the cylinder. The flow velocity at the cylinder surface increases as the flow moves away from stagnation point D until the boundary layer of the fluid separates from the cylinder surface at the point of separation S. Downstream from point S, vortices 12 alternately form on opposite sides of cylinder 10 to produce the well-known Karman vortex street. The point of separation S periodically varies as the vortices are produced. Point S oscillates about an average position which varies somewhat with flow velocity, this point being located at an angle $\theta$ within a range of about 75° to 85°, wherein $\theta$ is the angle between radii passing through points D and S.

As disclosed in said related application, sensors disposed on cylinder 10 may be employed to detect the vortices being shed from that cylinder. Sensors consisting of resistive films having high temperature coefficient of resistance (TCR) values are disposed on opposite sides of the cylinder, and a current is passed through the sensors to raise the temperature thereof above ambient temperature. Vortex shedding from the cylinder causes cyclic variations of velocity to occur across the resistors, thereby cooling them and changing their resistances at the same cyclic rate. The electrical signals from the sensors, which are 180° out of phase, may be fed to a differential amplifier which adds the signals and provides an output signal having a high signal-to-noise ratio.

Figure 2:
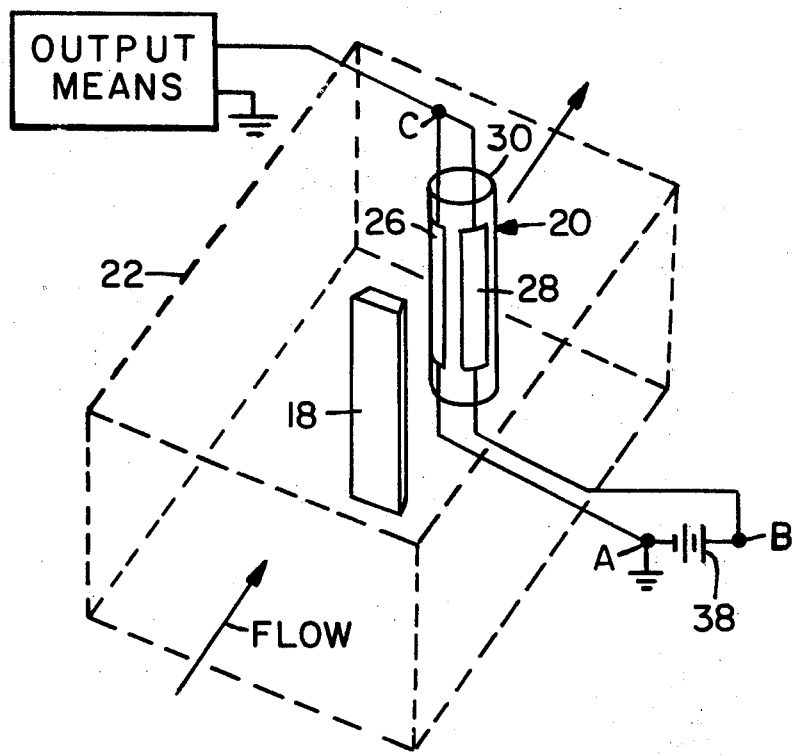
FIG. 2 is a schematic representation of a flow metering apparatus constructed in accordance with the present invention.

In accordance with the present invention vortex shedding element 18 is located near sensing element 20 that is downstream therefrom as shown in FIG. 2. The shedding and sensing elements are disposed in a duct 22 which is represented by dashed lines for the sake of clarity. Fluid flows parallel to the longitudinal axis of duct 22 in the direction of the arrows. Sensing element 20 is oriented within duct 22 so that it is parallel to shedding resistive element 18, and sensing resistive films 26 and 28 are located on the upstream surface thereof.

Figure 3:
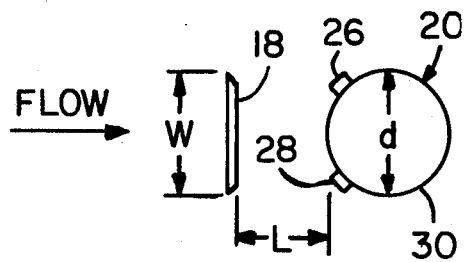
FIG. 3 is a diagrammatic representation of the vortex shedding and sensing elements of FIG. 2.

The vortex shedding element 18 should be symmetrically shaped with respect to a plane parallel to the direction of flow and preferably has sharp edges from which vortices can be shed with greater reliability than with smoother surfaces. For example, the shedding element can be a cylinder having a cross-section in the shape of an isoceles triangle which may or may not be truncated. As illustrated in FIG. 3, the thickness of the shedding element may be much less than its width W, good results having been obtained when the thickness was less than ½W. The widest part of the shedding element is preferably disposed upstream. The shedding element may have other cross-sectional shapes such as circular, elliptical or one of the modified circular shapes illustrated in the aforementioned U.S. Pat. No. 3,693,438.

Figure 5:
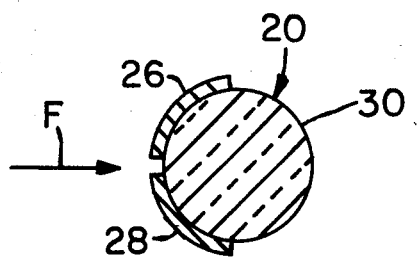
FIG. 5 is a cross-sectional view of the element of FIG. 4.
Figure 4:
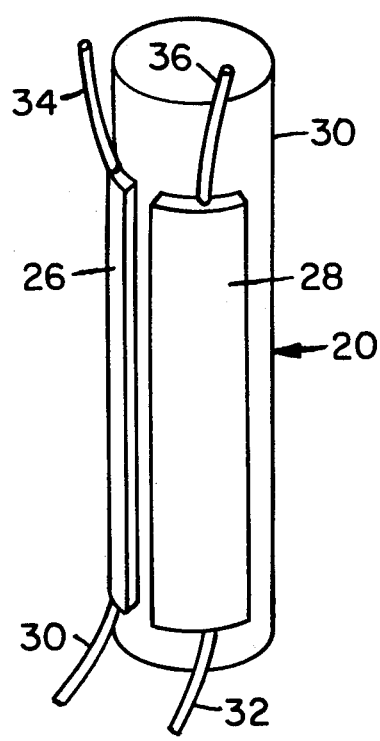
FIG. 4 is a detailed oblique view of the sensing element of FIG. 2.

Sensing element 20, which is shown in greater detail in FIGS. 4 and 5, includes a cylindrically shaped substrate 30 which may consist of nonconductive material, or it may consist of a conductive member having a nonconductive surface layer. The substrate material should have a low thermal conductivity so that it does not conduct away heat generated by the self-heated sensors 26 and 28 which are disposed on the surface thereof. The substrate may consist of glass, ceramic, plastic, insulated metal or the like, alkali free glass being preferred. The cross-sectional shape of the substrate may be circular, elliptical or some other noncircular shape such as the triangular shape illustrated in FIG. 6 wherein elements similar to those of FIGS. 4 and 5 are represented by primed reference numerals. The substrate may have any shape that is symmetrical with respect to a plane parallel to the direction of flow (arrow F) provided that the sensing resistors are so disposed that they are subjected to velocity variations caused by the vortices generated by shedding element 18.

Sensors 26 and 28 preferably consist of an electroconductive material which has a high TCR and which may be formed in films having a thickness less than 0.001 inch. Methods of forming high TCR resistive films are disclosed in U.S. Pat. Nos. 3,392,054 issued July 9, 1968 to M. Sapoff et al., No. 3,621,567 issued Nov. 23, 1971 to T. Hasegawa et al. and No. 3,637,532 issued Jan. 25, 1972 to E. Ramisch et al. A preferred resistive film and a method of making the same are disclosed in copending application Ser. No. 507,284 entitled "Temperature Sensing Device and Method" filed Sept. 19, 1974. Resistive films less than 0.001 inch thick do not generate turbulence which would result in an output signal having an increased amount of turbulence generated noise.

Figure 6:
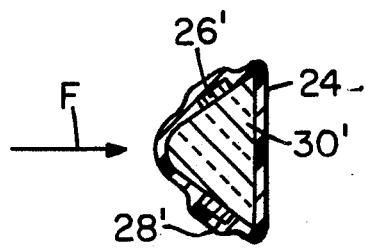
FIG. 6 is a cross-sectional view of another embodiment of a sensing element.

FIG. 6 also illustrates that a thin protecting coating 24 of nonconductive material such as glass, plastic or the like may be disposed on the surfaces of the resistive films. Coating 24 should be as thin as possible and yet be continuous. The thickness of the coating should not exceed 0.001 inch since greater thicknesses will severely dampen the response of the resistive films to the flowing fluid. Polyimide coatings have functioned quite well. Other plastic materials which can be employed are epoxies, silicones, teflons and the like.

Various known techniques may be employed to pattern the resistive films which form sensors 26 and 28. The entire surface of substrate 30 may be initially coated with a film of resistive material. Elongated strips may be formed by removing portions of the initially deposited film by chemical or mechanical techniques. For example, certain portions of the film can be masked with an etch-resistant material prior to subjecting the substrate-film combination to an etchant which removes the unmasked portions of the film. Unwanted portions of a film could also be removed by directing a laser beam thereon. Sensors 26 and 28 could also be made by applying a release material such as a slurry of clay to selected portions of the substrate 30 by suitable means such as offset printing. The substrate coated in this manner is subjected to a process such as chemical vapor deposition which forms at least a part of films 26 and 28. That part of the film material deposited over the slurry does not adhere to the substrate and is easily removed. Depending upon the material so deposited, it may itself function as a high TCR resistive film, or additional layers may be deposited on the surface of the initially deposited films by means such as electrodeposition in order to provide films having the desired properties, as disclosed in the aforementioned patent application Ser. No. 507,284.

Substrate 30 may be provided with end caps each having a plurality of conductive terminal portions, a respective terminal portion contacting the end of one of the resistive films. Alternatively, electrical connection can be made to the ends of the resistive films by soldering conductive leads 30, 32, 34 and 36 thereto, as shown in FIG. 4.

Figure 7:
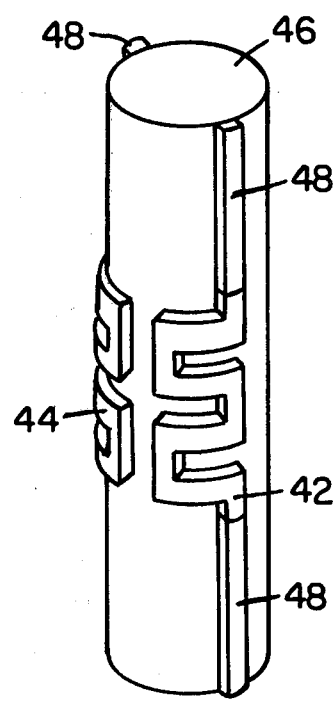
FIG. 7 is an oblique view of another embodiment of a sensing element.

It may be advantageous, under certain conditions of flow, to measure the flow only at a small area within a duct. For example, the flow rate may be nonuniform across the duct, and it may be desirable to measure the flow rate at the center of the duct. To make such measurements, the sensing resistive films may be of the type illustrated in FIG. 7 wherein resistive films 42 and 44 are disposed on the central portion of cylindrical substrate 46. Since films 42 and 46 extend only a short distance along the length of the cylinder, it may be necessary to pattern the films in a zig-zag or serpentine pattern to increase the resistances thereof to the desired values. Conductive paths 48 extend from films 42 and 44 to the ends of substrate 46 where electrical connection can be made thereto as previously discussed.

Figure 8:
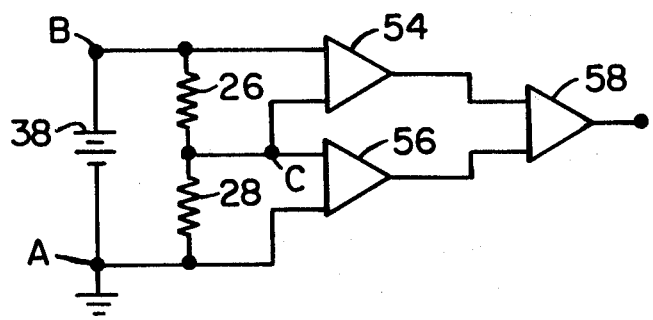
FIG. 8 is a schematic diagram of a circuit that can be employed with the present invention.

Referring again to FIG. 2 resistive films 26 and 28 are connected in series across source 38 of dc voltage. Current flowing through the sensing resistors heats them to a temperature above ambient and provides the voltage drops across these resistors which are sensed by the output means. FIG. 8 schematically illustrates in greater detail the output means which is illustrated in block diagram form in FIG. 2. The voltage drops across resistors 26 and 28 are coupled to differential amplifiers 54 and 56, respectively, and the output signals from these amplifiers are coupled to a subtracting amplifier 58. This circuit adds the signals from resistors 26 and 28 and substantially cancels the in-phase noise components.

Referring to FIGS. 2 and 3, vortices are alternately generated from opposite sides of shedding element 18 and these vortices are swept downstream toward sensing element 20 where they cool resistive films 26 and 28. When the distance L between the shedding and sensing elements is less than the width W of the shedding element, the output signal to noise ratio decreases since the sensing resistive films are disposed in the turbulence behind the shedding element. When the distance L is greater than about 6W, the fluid dynamic coupling between the shedding and sensing elements begins to noticeably decrease and the output signal from the amplitude drops. The preferred distance L between the shedding and sensing elements is between about W and 1.5W.

The width W of a thin shedding element such as that illustrated in FIG. 3 should be approximately equal to or slightly greater than the distance $d$ across the sensing element, which is the diameter of the right circular cylinder illustrated. When the shedding and sensing elements have the same cross-sectional shapes, the distances across such elements are preferably substantially the same.

The combined effect of the shedding and sensing elements, when oriented in accordance with the preferred embodiment of the present invention, results in at least a six-fold increase in output signal amplitude as compared with the output signal generated by resistive films which are disposed on the element from which the vortices are shed. Moreover, the signal generated by the system of FIG. 2 is relatively free from turbulence generated noise.

To a large extent the improved performance of the flow meter of this invention is attributed to the shape of the preferred shedding element, i.e., its sharp vortex-generating edges and to the proximity of the shedding and sensing elements. Also important is the location of the sensing resistors on the upstream surface of the substrate where they are not subjected to any turbulence that may be generated by that substrate. The system of FIG. 2 provided a continuous output signal free from gaps and noise caused by such turbulence.

An embodiment suitable for measuring flow through an air intake manifold of an automobile engine appeared similar in construction to FIG. 2. Duct 22 was 1 inch high and 4 inches wide. Elements 26 and 28 extended between the top and bottom surfaces of the duct. The width W of shedding element 18 and the diameter $d$ of substrate 30 were both 0.098 inches. The spacing L between the shedding and sensing elements was about 0.147 inches. Resistive films 26 and 28 consisted of thin films of tin-antimony oxide having a thin layer of nickel thereon. These films, which were less than 0.001 inch thick, were formed in accordance with the method disclosed in the aforementioned Adler et al patent application Ser. No. 507,284. Films 26 and 28 were connected in series across a source of 9.5 volts dc. The resistances of the films were such that 0.23 amps flowed through the films. This caused about 1 watt to be dissipated in each of the resistive films to raise the temperature thereof. This system provided good output signals at velocities as high as 330 ft/sec, the highest air velocity at which this system was tested.

We claim:

1. Flow metering apparatus for measuring the velocity of a fluid stream comprising
    an elongated vortex shedding element disposed transversely in said fluid stream for alternately producing vortices on opposite sides thereof, the greatest width of said shedding element measured transversely of the direction of fluid flow being equal to W,
    an elongated cylindrically shaped substrate having a nonconductive surface, said substrate being disposed downstream of said shedding element and substantially parallel thereto, the distance between said shedding element and said substrate being between W and 1.5W,
    a pair of resistive films disposed on opposite sides of the upstream surface of said substrate, the resistivity of said films being variable with temperature,
    means connected to opposite ends of said resistive films for causing a current to flow therethrough that is sufficient to heat said films to a temperature above that of the fluid stream, and
    means for detecting the periodic changes in resistance of said films as said vortices cause differential cooling of said films, and for providing an electrical output indicative of the velocity of said fluid stream.

2. An apparatus in accordance with claim 1 wherein the upstream surface of said shedding element is planar and the thickness thereof is less than 1/2W, said shedding element having sharp edges.

3. An apparatus in accordance with claim 2 wherein said substrate is a right circular cylinder.

4. An apparatus in accordance with claim 3 wherein said resistive films are elongated rectangular films.

5. An apparatus in accordance with claim 3 wherein said resistive films are patterned in a zig-zag configuration.

6. An apparatus in accordance with claim 1 further comprising a coating of nonconductive material disposed on the surfaces of said resistive films.

7. Flow metering apparatus comprising
    means defining a chamber which is adapted to conduct fluid in the direction of the longitudinal axis thereof,
    an elongated vortex shedding element disposed in said chamber transverse to said longitudinal axis for alternately producing vortices on opposite sides thereof, said shedding element extending from opposing surfaces of said chamber defining means, said shedding element having a cross section in the shape of a truncated isosceles triangle, the base of which faces upstream, the distance across the upstream surface of said shedding element being W and the thickness of said shedding element being less than ½W, an elongated cylindrically shaped substrate extending from opposing surfaces of said chamber defining means and being parallel to said shedding element, said substrate having a nonconductive surface and being disposed downstream of said shedding element, the distance between said shedding element and said substrate being between W and 1.5W, a pair of resistive films disposed on opposite sides of the upstream surface of said substrate, the resistivity of said films being variable with temperature, means connected to opposite said ends of said resistive films for causing a current to flow therethrough that is sufficient to heat said films, and means for detecting the periodic changes in resistance of said films as said vortices cause differential cooling of said films, and for providing an electrical output indicative of the velocity of the fluid flowing through said chamber.

8. An apparatus in accordance with claim 7 wherein said resistive films are rectangularly shaped and extend substantially the entire length of that portion of said substrate that is disposed between opposed surfaces of said chamber defining means.

9. An apparatus in accordance with claim 7 wherein said resistive films are disposed in the central portion of said substrate and are patterned in a zig-zag configuration.

10. An apparatus in accordance with claim 7 wherein said dimension W is less than 0.1 inch.

11. An apparatus in accordance with claim 7 wherein the area of the upstream surface of said shedder is less than 1/10 the cross-sectional area of said chamber.

* * * * *